A. H. REID.
Scrapers.

No. 139,816.

Patented June 10, 1873.

Witnesses,
J. S. Singer
Harry Smith

Alban H. Reid
by his attys.
Howson and Son

UNITED STATES PATENT OFFICE.

ALBAN H. REID, OF BRANDYWINE MANOR, PENNSYLVANIA.

IMPROVEMENT IN SCRAPERS.

Specification forming part of Letters Patent No. 139,816, dated June 10, 1873; application filed March 27, 1873.

*To all whom it may concern:*

Figure 1:
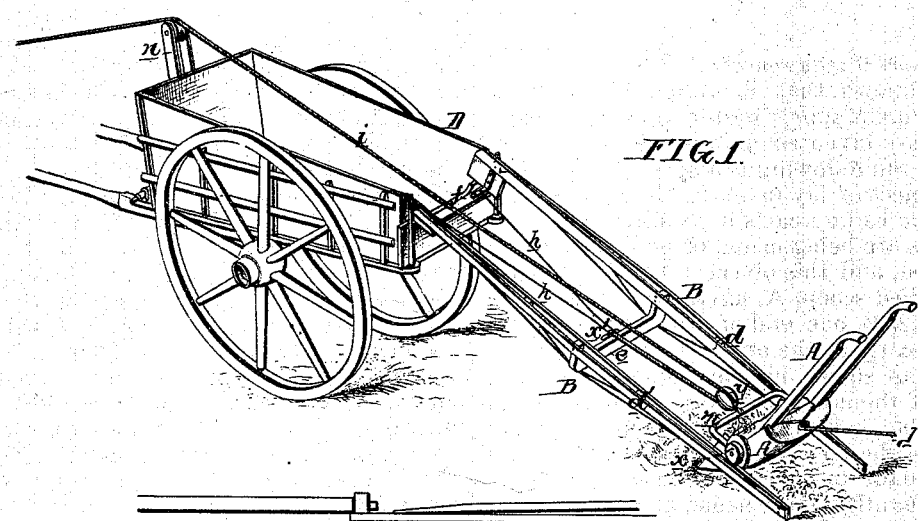

Be it known that I, ALBAN H. REID, of Brandywine Manor, Chester county, Pennsylvania, have invented an Improved Excavator, of which the following is a specification:

The object of my invention is to afford facilities for loading carts in localities where excavations are being made, or grading is being conducted, and this object I attain by means of a handled scoop, A, having rollers adapted to a frame, B, one end of which rests on the tail of a cart, D, the other end resting on the ground, as shown in the perspective view, Fig. 1, of the accompanying drawing, so that by suitable hauling-tackle and by a proper control of the handles of the scoop, the latter may be made to penetrate the soil, receive a proper quantity of the same, and convey it to and tilt it into the cart.

Figure 2:
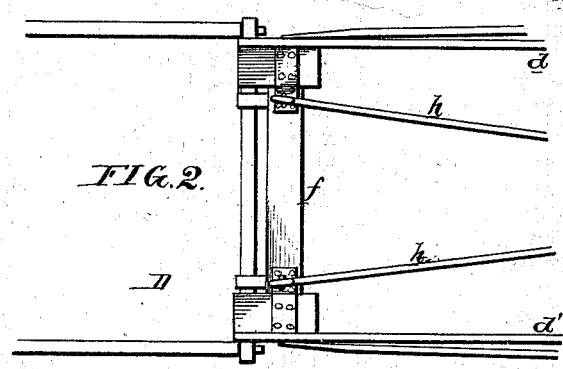
Figure 3:
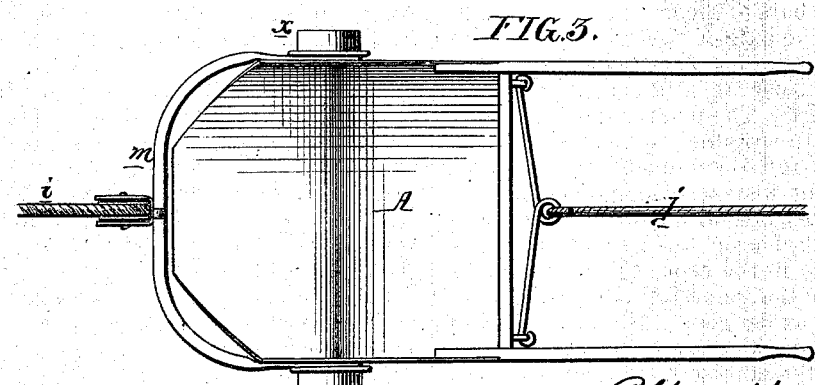

The frame B consists of two parallel bars or ways, $d$ and $d'$, properly trussed and connected together midway, or thereabout, between their opposite ends, by a cross-bar, $e$, and at the upper end by a cross-bar, $f$, between which cross-bars the frame is stiffened by diagonal bars $h$ $h$, as shown in the plan view, Fig. 2, and referred to hereafter. Below the cross-bar $e$ the space between the longitudinal bars of the frame is unobstructed, so as to permit the free action of the scoop A on the soil, this scoop, a plan view of which is shown on an enlarged scale in Fig. 3, having flanged wheels $x$ $x$ adapted to the bars of the frame, and a bail, $m$, connected to the axle of the wheels, and furnished with a pulley for the hauling-rope, which passes over an attachment, $n$, at the front of the cart. The front end of the frame is provided with suitable appliances for ready attachment to and detachment from the tail of the cart, but instead of employing two of these appliances, one arranged at each side, as shown in Fig. 2, I propose, in some instances, to use one only in the center, as this will enable the angle of the frame, in respect to the cart, to be changed as desired. As a horse hitched to the hauling-rope $i$ draws the scoop toward the cart an attendant so manipulates its handles that the front of the scoop shall penetrate the soil to the desired extent, and receive a proper load, after which the handles are depressed and the scoop thereby elevated above the ground. After it has passed the cross-bar $e$ of the frame the scoop may be released by the attendant, as it will bear on and traverse the bars $h$ $h$ of the frame until it arrives at the body of the cart, into which its contents will be tilted by the continued pulling of the hauling-rope after the wheels of the scoop have been arrested by the cart or by any attachment to the frame. After the scoop has thus delivered its load it may be drawn down the frame by the rear hauling-rope $j$.

Although any suitable hauling appliances may be used, I prefer that illustrated in the drawing, where it will be observed that the end $x'$ of the hauling-rope catches between the diagonal braces $h$, and cannot pass rearward beyond the cross-bar $e$, so that during the digging operation the block $y$ is utilized and increased power obtained, while when the scoop has been raised from the ground and is being drawn into the cart the end $x$ of the rope is caught by the block and slides forward with the scoop, which is thus moved twice as fast as before.

The position of the cart and frame may be changed from time to time as fresh soil has to be dug and deposited in the cart, and when the latter has been fully loaded the frame may be applied to an empty cart.

I claim as my invention—

1. The combination of the handled scoop A, suitable hauling appliances, and the frame B adapted to the cart, all substantially as set forth.

2. The frame B composed of the parallel trussed bars $d$ $d'$, cross-bars $e$ and $f$, and diagonal bars $h$ $h$, all constructed and arranged as and for the purpose set forth.

3. The handled scoop A, its wheels $x$ $x$, the bail $m$ connected to the axle of the scoop, and the within-described hauling appliances or their equivalents.

In testimony whereof I have signed my name to this specification in the presence of two subscribing witnesses.

ALBAN H. REID.

Witnesses:
WM. A. STEEL,
HUBERT HOWSON.